United States Patent [19]

LaMotta et al.

[11] Patent Number: 5,356,649

[45] Date of Patent: Oct. 18, 1994

[54] METHOD AND APPARATUS FOR PROCESSNG AND PACKAGING FOODS

[76] Inventors: Richard LaMotta, 93 Haights Cross Rd., Chappaqua, N.Y. 10514; James Guido, 10 Belmont Pl., Yonkers, N.Y. 10701

[21] Appl. No.: 2,887

[22] Filed: Jan. 11, 1993

[51] Int. Cl.⁵ .............................. B05B 55/00
[52] U.S. Cl. .................... 426/396; 426/401
[58] Field of Search ........... 426/234, 241, 113, 291, 426/296, 303, 644, 392, 394, 396, 401

[56] References Cited

U.S. PATENT DOCUMENTS 4,917,912 4/1990 Duncan ..................... 426/291
4,994,638 2/1991 Iorns et al. ................. 426/113

Primary Examiner—Frank Spear
Attorney, Agent, or Firm—James & Franklin

[57] ABSTRACT

Different new foods are placed into separate open compartments of specially dimensioned plastic trays. Groups of filled trays are placed in a magazine and simultaneously sealed with an oxygen barrier film under carefully controlled vacuum conditions. The film is cut, separating the trays which are placed on a pan in an oven. Dry heat is applied and steam is introduced during timed periods at given intervals during cooking. The trays are then removed from the oven and quickly chilled or frozen.

6 Claims, 5 Drawing Sheets

METHOD AND APPARATUS FOR PROCESSNG AND PACKAGING FOODS

The present invention relates to the commercial preparation and packaging of food and more particularly to a method and apparatus for processing and packaging fully cooked meals consisting of at least two different categories of food products for later reheating in residential ovens which preserves the flavor, texture and the nutritional value of each of the foods, comparable to freshly prepared.

Conventional methods of packaging of cooked foods for mass distribution which are prepared for later reheating in residential ovens commonly result in a product which does not have the same qualities as freshly prepared. These foods often have altered flavor and consistency, poor texture and greatly diminished nutritional value. Moreover, the shelf-life of such foods is limited for example, to only a week or at best two weeks if properly refrigerated and several months, if frozen.

Many packages used in conventional systems include a tray divided into compartments which keep the individual foods separate, for example, the meat separate from the vegetables. Originally, these trays were made of metal, such as aluminum, but now are more often composed of plastic because of the lower cost and increased popularity of microwave ovens.

The individual foods are separately fully cooked prior to being placed into the compartments in the trays in conventional systems. The compartments are then covered by foil or plastic wrap and frozen.

We take a different approach. We use a specially designed oxygen barrier tray. In most cases, individual foods are placed in compartments in the tray in the uncooked state. However in some specific instances, it may be desirable to pre-cook certain foods, at least partially. The individual compartments of the tray are then sealed using an oxygen barrier film, under a carefully controlled vacuum. The proper combination of materials, compartment depth and vacuum control result in the optimum seal which will keep vegetables crisp and meat tender.

The sealed tray is heated in a specialty designed oven for cooking and pasteurization. The oven primarily delivers dry heat. However, it includes facility to introduce steam into the cooking chamber during spaced time periods of controlled duration. The steam serves to tenderize the foods, particularly the vegetables, but is used intermittently to avoid loosing natural crispness.

Thereafter, the tray is quickly cooled to an optimum refrigerator temperature, around 45° F., at which it will have a shelf-life of over 60 days. Alternatively, this product can be frozen in a blast freezer and should last for years. The increased shelf-life substantially reduces the problems normally associated with distribution of processed foods.

It is, therefore, a prime object of the present invention to provide a method and apparatus for commercially processing and packaging meals for residential reheating in which different categories of foods can be processed and packaged simultaneously and retain their individual flavors, textures and nutritional value, comparable to freshly prepared.

It is another object of the present invention to provide a method and apparatus for processing and packaging foods which will have a greatly extended shelf-life when refrigerated or frozen as compared to similarly maintained conventionally processed foods.

It is another object of the present invention to provide a method and apparatus for processing and packaging foods which employs a dry heat oven having capability for introducing steam into the cooking chamber during timed periods at given intervals.

In accordance with one aspect of the present invention, a method of processing and packaging food in specially dimensioned, compartmented plastic trays is provided. The method includes placing different food products in the open top compartments of the tray. The top of each compartment is then vacuum sealed with a thin oxygen barrier film. The sealed trays are heated to a predetermined temperature in an enclosed environment into which steam is introduced during timed periods at given intervals. The trays are then cooled quickly.

The step of placing food products in the tray preferably includes placing non-cooked food products in the tray. However, in some instances, this step may include partially or completely cooking the food product prior to placement into the tray.

Preferably, the food products are placed into several trays making a group. The group of trays are placed into a magazine having cavities designed to receive each tray. An oxygen barrier film is placed over the magazine. All of the trays in the group are simultaneously vacuum sealed with the film. The film is cut to separate the trays. The separate trays are then removed from the magazine.

The step of heating the tray preferably includes placing a plurality of the trays on a pan. The pan is placed in an oven. The oven is dry heated for a given time period. Steam is introduced into the oven chamber during timed periods at spaced intervals.

In accordance with another aspect of the present invention, an oven is provided for cooking foods previously placed in open compartments of plastic trays which have been vacuum sealed with oxygen barrier film. The oven includes an enclosed chamber into which the trays are placed. Means are provided for dry heating the chamber to a given temperature. Means, adapted when actuated, are provided for introducing steam into the chamber. Control means for actuating the steam introducing means are provided. The control means actuates the steam introducing means for prescribed periods of time at designated spaced intervals The steam introducing means preferably includes steam generating means. The steam generating means may be located internally or externally of the oven chamber.

In accordance with another aspect of the present invention, a tray is provided for receiving food products in which the food products are processed and sold. The tray is composed of crystalized polyethylene terephthalate (CPET) and has at least two recesses forming separate food receiving compartments, each with an open top. The recesses preferably have a depth of 1.1 inch.

Oxygen barrier film of approximately 6 mils. thickness is provided for sealing the open top of each compartment. The film preferably includes multiple layers of Du Pont Surlyn resins, EVOH and nylon and a heat activated seal layer.

To these, and to such other objects which hereinafter appear, the present invention relates to a method and apparatus for processing and packaging foods, as set forth in detail in the following specification and recited in the annexed claims, taken together with the accompanying drawings, wherein like numerals refer to like parts and in which:

Figure 1:
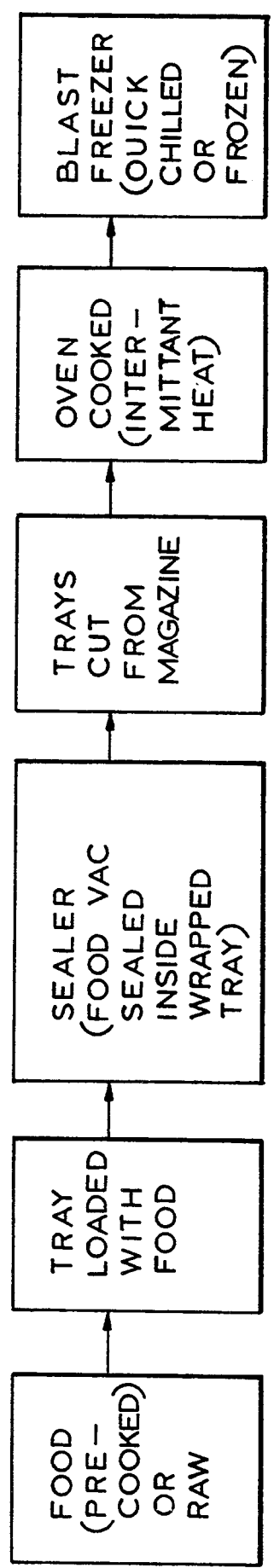
FIG. 1 is a flow diagram of the method of the present invention.

As illustrated in FIG. 1, the method of the present invention preferably begins with raw ingredients from two or more different food categories, such as meat, potatoes and vegetables. In some instances, it may be preferably to partially or completely pre-cook one or more of the individual foods. However, it is preferable to have all of the ingredients raw.

The ingredients from the different food categories are placed into separate open top compartments in injection molded plastic trays specially designed to maintain freshness, withstand the processing temperatures and pressures to which the package will be subjected and to permit reheating in both conventional and microwave ovens. In particular, the trays are preferably composed of crystalized polyethylene terphthalate (CPET) and are preferably 0.03 mil. thick. The depth of the compartments is selected to be 1.1 inch. This depth has been found to permit sealing and cooking with the best results.

Several of the trays are loaded into a magazine. The magazine is placed into a vacuum sealing apparatus. A sheet of oxygen barrier film, approximately 6 mils. thick and preferably transparent, is placed over the magazine. The film is preferably composed of multiple layers including DuPont Surlyn resins, EVOH and nylon, and a heat activated seal layer. The film is heated and stretched. A vacuum is formed in the compartments and carefully controlled. The film shrinks tightly over the food and seals to the raised edges of the tray by heat. The vacuum should typically be in the range of 23 to 24 inches mercury. The sealed trays are separated by cutting the film along the lines between them.

The trays are placed in pans in a rack designed for this purpose. The rack is hung in an enclosed oven chamber specially fabricated to provide continuous heat for a duration of typically 30–55 minutes at approximately 195° F. During timed periods of about 60 seconds each, every 8 to 10 minutes, steam is introduced into the oven chamber. This intermittent steam cooking procedure results in a tender yet crisp product.

The trays are then chilled quickly to a refrigeration temperature (approximately 45° F.). Alternatively, they can be frozen in a blast freezer.

It has been determined that the shelf-life of the product, if refrigerated at ideal temperatures, should be approximately 60 days. If frozen, the product should last for years.

Figure 2:
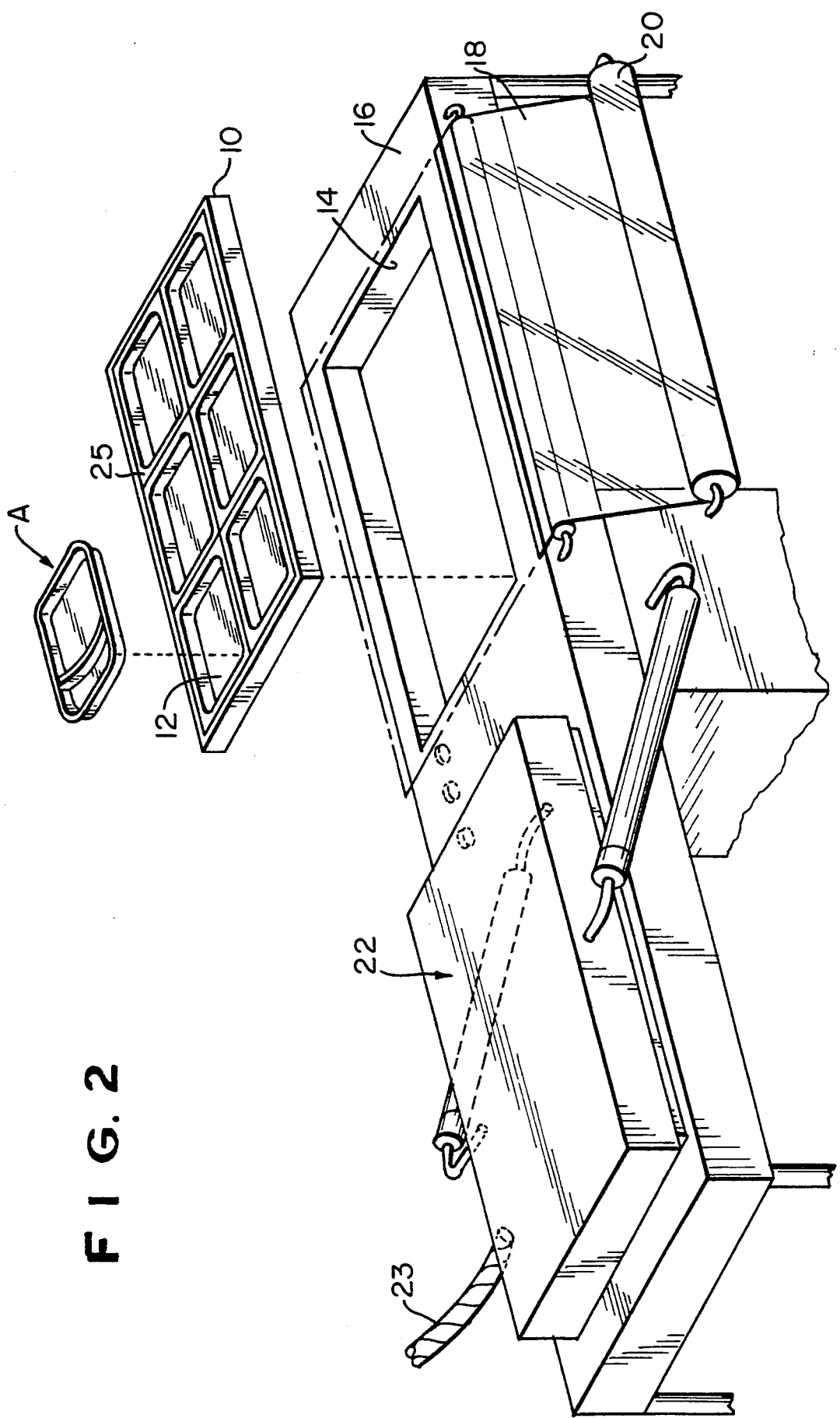
FIG. 2 is an isometric view of the vacuum sealing apparatus.

FIG. 2 illustrates the sealing operation. Preloaded trays, generally designed A, are placed in a magazine 10 having recesses 12 designate to receive a group of trays A simultaneously.

The magazine 10 with the trays A loaded therein is placed in a cavity 14 formed in a table 16. A sheet of 6 mils. thick multilayer oxygen barrier film 18, from a roll 20 secured to the side of the table, is placed over the magazine.

Figure 3:
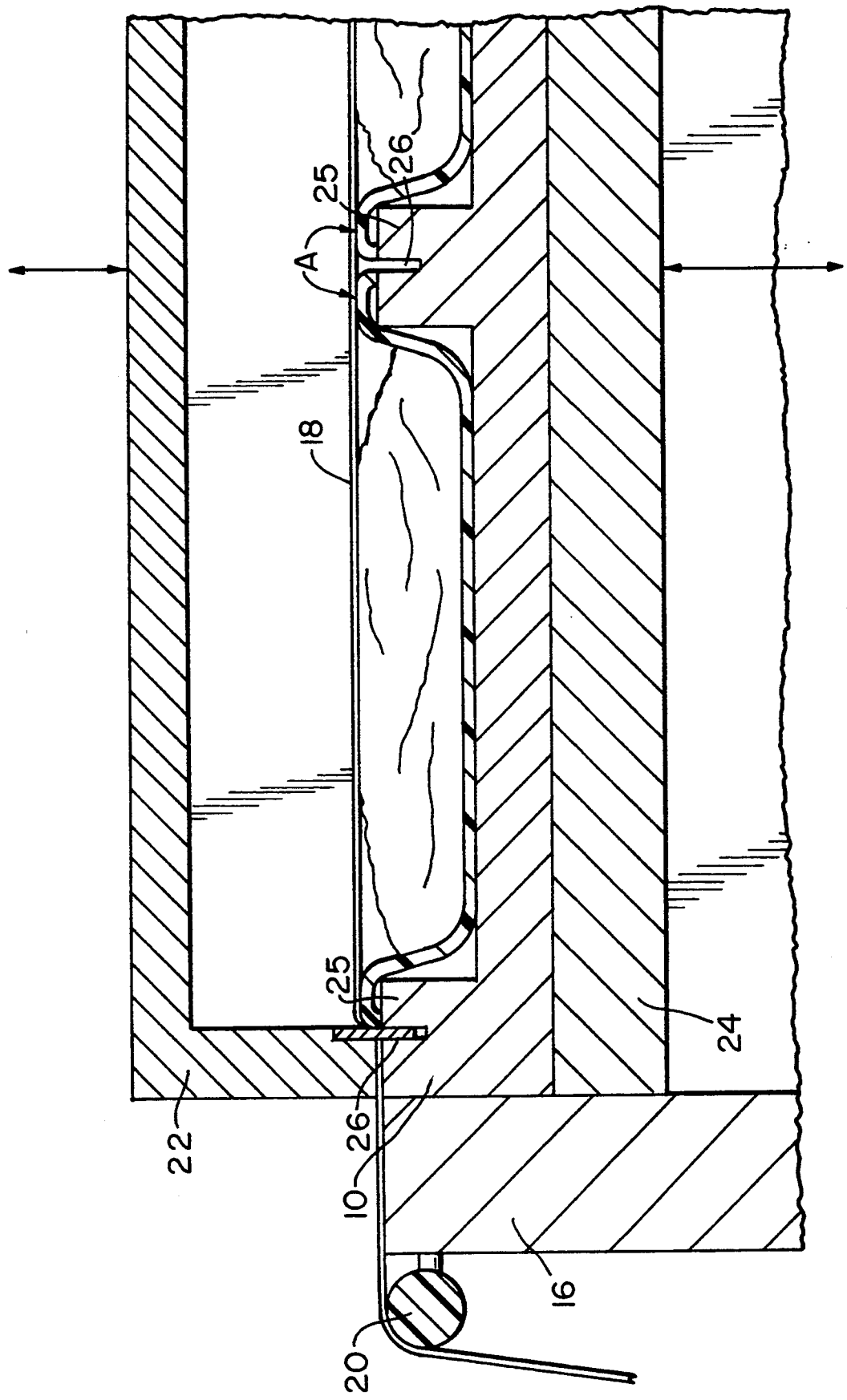
FIG. 3 is a cross-section view taken along line 3—3 of FIG. 2.

Sealing arm 22, which is connected to a vacuum source by hose 23, pivots over the top of the magazine. A plate 24, moves into place beneath magazine 10 (FIG. 3). The film is heated and stretches. A vacuum is applied to the compartments. With the vacuum in the tray compartments carefully controlled within the range 23–24 inches mercury, for example, film 18 shrinks and is tightly sealed to the raised edge portions of the trays.

As best seen in FIG. 3, the magazine 10 has upstanding walls 25 with vertical slots 26 which permit the film to be cut to sever the trays after arm 22 is removed. The individual trays are thus separated and removed from the magazine.

Figure 4:
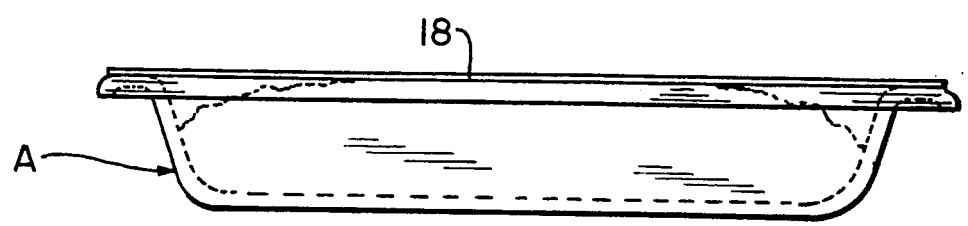
FIG. 4 is a side view of a sealed tray after separation.

FIG. 4 shows a typical tray A after sealing. Tray A is 0.03 mils thick and is made of an oxygen barrier material such as crystalized polyethylene terephalate (CEPT). The compartments are each 1.1 inch deep.

Figure 5:
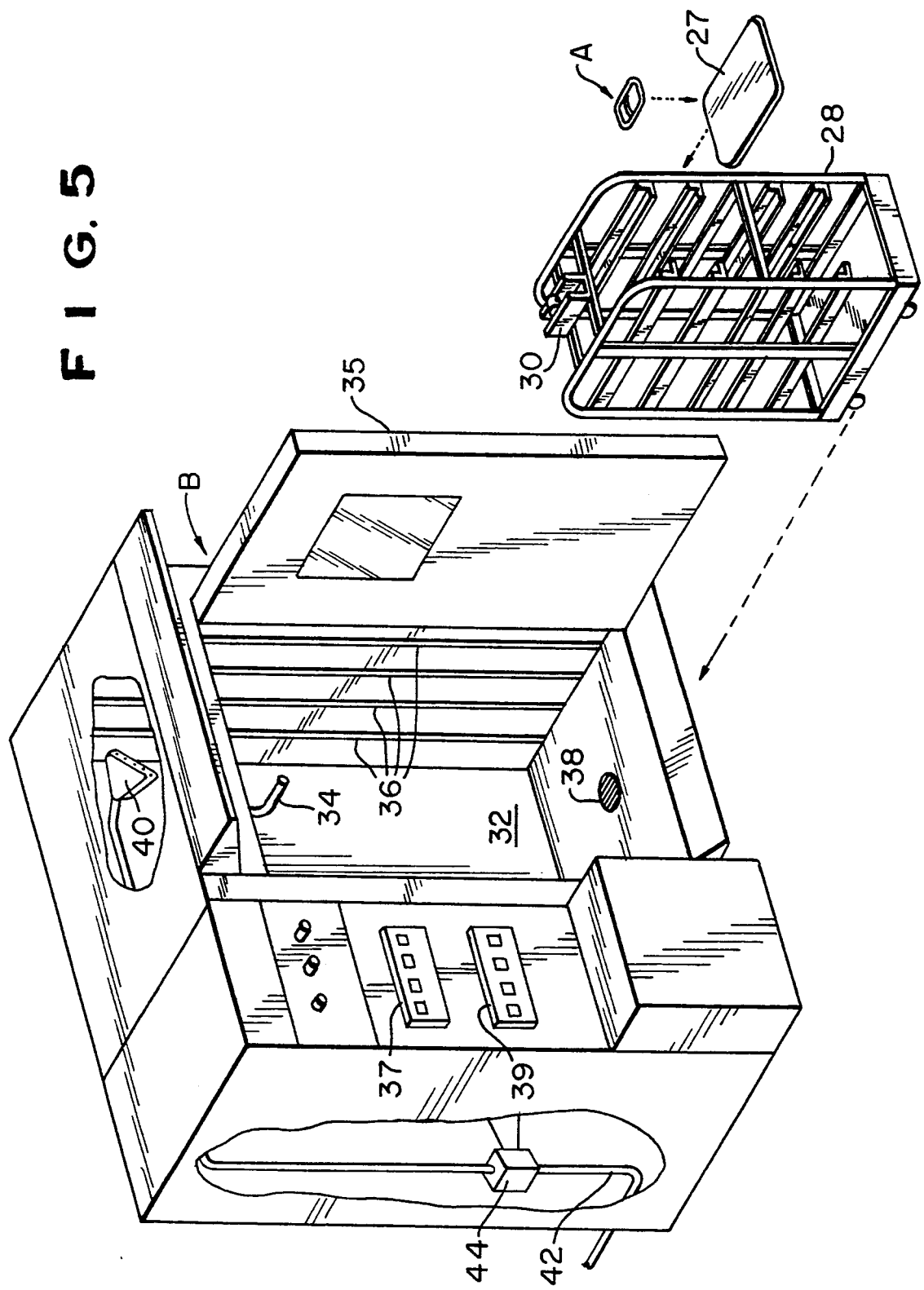
FIG. 5 is an isometric view of the oven.

FIG. 5 illustrates the oven of the present invention. Trays A, after sealing, are placed on a pan 27 which, in turn, is received in a rack 28 designed for this purpose. Rack 28 is provided with a bracket 30 at the top thereof. Rack 28 is received in the chamber 32 of the oven, generally designated B, by sliding bracket 30 over a bracket receiving arm 34 present near the top of chamber 32.

Once door 35 is shut, oven B provides a dry heat, for example by electric coils 36 located along the side of the oven, as is conventional. The chamber is held at a predetermined temperature, for example 195° F., for a predetermined cooking time typically 30 to 55 minutes, determined by a timer such as digital clock circuit 37. Oven B includes a means for introducing steam into chamber 32 for timed periods of approximately 60 seconds each at spaced intervals of 8 to 10 minutes, during cooking.

Figure 6:
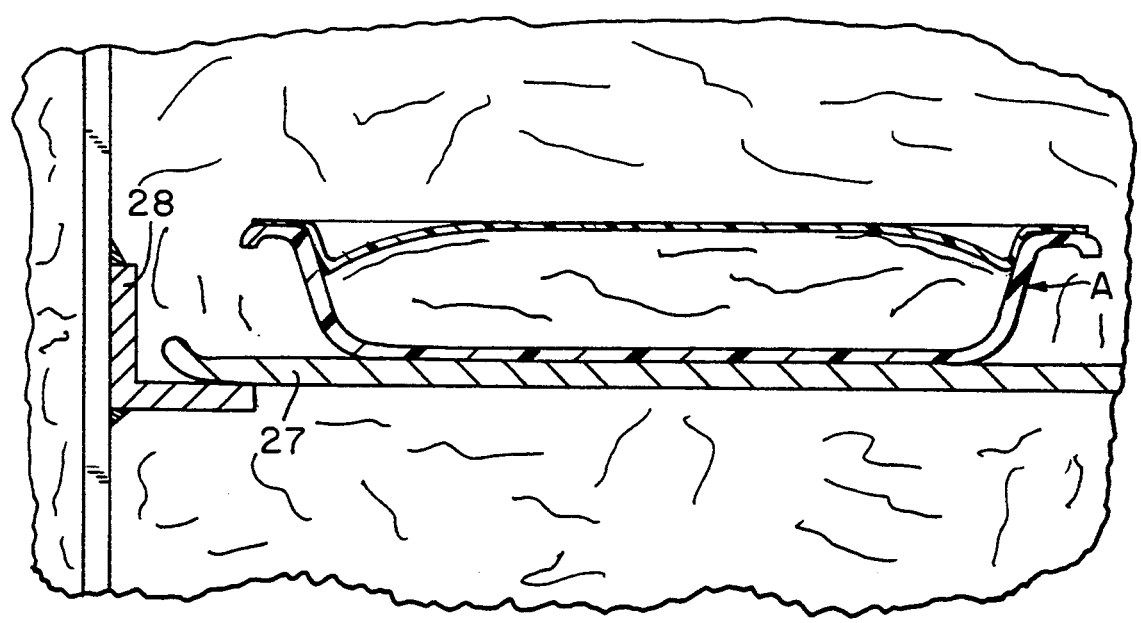
FIG. 6 is a cutaway view of the inside of the oven.

The steam may be generated externally from the oven and released into the chamber through a valve which is controlled by any conventional digital or analog timing circuit 39. Alternatively, the steam may be generated internally by spraying water from a spray head 40 onto heated coils 36 in a carefully controlled manner. In this case, the water flow through hose 42 which feeds head 40 is controlled by a solenoid connected to circuit 39. A drain 38 is provided in the bottom of the oven for removal of water. The steam portion of the cooking cycle is illustrated in FIG. 6.

It is the intermittent use of the wet (steam) heat, at controlled times during the heat cycle, in combination with the specially dimensioned tray and the materials selected for the tray and sealing film which result in fully cooked and pasteurized foods which are both tender and crisp.

It should now be appreciated that the present invention is a method and apparatus for commercially processing and packaging pre-cooked meals including several different categories of foods for reheating in conventional and microwave ovens which retains the flavor, texture and nutritional value of each of the foods, comparable to freshly prepared. Moreover, the product has a greatly extended shelf-life as compared to similarly refrigerated or frozen foods.

While only a single embodiment of the present invention has been disclosed for purposes of illustration, it is obvious that many modifications and variations could be made thereto. It is intended to cover all of these modifications and variations which fall within the scope of the invention, as defined by the following claims:

We claim:

1. A method of processing and packaging food in compartmented plastic trays, the method comprising the steps of: placing different food products into the open top of the compartments of the tray; sealing the top of each compartment with a thin oxygen barrier film, under vacuum; heating the sealed tray to a predetermined temperature for a given time period in an enclosed environment into which steam is introduced during timed periods at given intervals, and cooling quickly.

2. The method of claim 1 wherein the step of placing food products in the tray comprises the step of placing raw food products in the tray.

3. The method of claim 1 wherein the step of placing food products in the tray comprises the step of cooking the food products prior to placing them into the tray.

4. The method of claim 1 wherein the step of placing food products into the tray comprises the step of placing food products into the compartments in a number of trays forming a group.

5. The method of claim 4 wherein the step of sealing comprises the steps of placing the trays in the group into a magazine having a cavity adapted for receiving same, placing an oxygen barrier film over the magazine, evacuating the compartments to 23 to 24 inches of mercury, sealing all of the trays in the group simultaneously with the film, cutting the film to separate the trays and removing the sealed trays from the magazine.

6. The method of claim 4 wherein the step of heating the tray comprises the steps of placing a plurality of trays on a pan, placing the pan in an oven, dry heating the oven for a given time period of between 30 and 55 minutes and introducing steam into the oven during timed periods of approximately 60 seconds each, at intervals of 8 to 10 minutes.

* * * * *